United States Patent Office 3,642,957
Patented Feb. 15, 1972

3,642,957
PHOSPHATE AND PHOSPHONATE ESTERS OF
2-CYANOGLYOXYLAMIDE-2-OXIME
James Billet, Piscataway, N.J., assignor to
Mobil Oil Corporation
No Drawing. Filed June 9, 1969, Ser. No. 831,738
Int. Cl. C07f 9/08, 9/40; A01n 9/36
U.S. Cl. 260—940     2 Claims

ABSTRACT OF THE DISCLOSURE

Phosphate and phosphonate esters of 2-cyanoglyoxylamide-2-oxime and the N-substituted derivatives thereof are new compounds having a broad spectrum insecticidal activity.

BACKGROUND OF THE INVENTION

Field of the invention

This invention is concerned with novel phosphates and phosphonates of 2-cyanoglyoxylamide-2-oximes and their use as insecticides.

Description of the prior art

Phosphate esters of cyano-substituted oximes of hydrocarbons, such as arylmethanes and alkanes, and of alkyl ethers and thioethers have been proposed as insecticides in Netherlands No. 6605907. Insofar as is now known, the class of compounds of this invention have not been shown in the art.

SUMMARY OF THE INVENTION

This invention provides compounds having the formula:

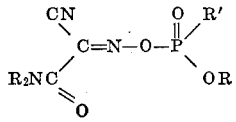

wherein R is the same or different hydrogen, alkyl ($C_1$-$C_5$), alkenyl ($C_2$-$C_6$), cycloalkyl ($C_3$-$C_6$), aryl, haloalkyl, haloalkenyl, or haloaryl; and R' is alkyl ($C_1$-$C_5$), alkenyl ($C_2$-$C_6$), cycloalkyl ($C_3$-$C_6$), aryl, alkoxy ($C_1$-$C_5$), alkenoxy ($C_2$-$C_6$), cycloalkoxy ($C_3$-$C_6$), or aryloxy. It also provides insecticidal compositions comprising these compounds and a carrier and the method of combatting insects by contacting them with at least one of these compounds.

DESCRIPTION OF SPECIFIC EMBODIMENTS

It appears that the best way to name the individual compounds of this invention is on the basis of substituted glyoxylamide. For example, the following structures are named as indicated below each structure.

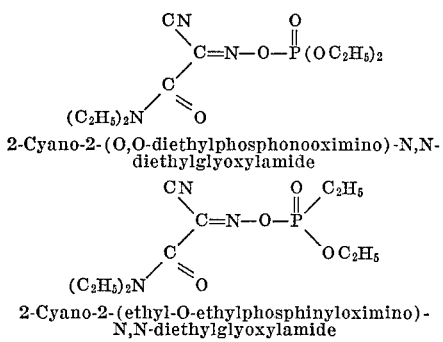

2-Cyano-2-(O,O-diethylphosphonooximino)-N,N-diethylglyoxylamide

2-Cyano-2-(ethyl-O-ethylphosphinyloximino)-N,N-diethylglyoxylamide

This system of nomenclature will be used throughout the specification.

Non-limiting examples of the compounds of this invention are:

2-cyano-2-(O,O-dibutylphosphonooximino)-N-butylglyoxylamide;
2-cyano-2-(O,O-divinylphosphonooximino)-N-cyclohexylglyoxylamide;
2-cyano-2-(O,O-dicyclohexylphosphonooximino)glyoxylamide;
2-cyano-2-(O,O-diphenylphosphonooximino)-N,N-divinylglyoxylamide;
2-cyano-2-(O,O-dichloroethylphosphonooximino)-N-bromoethylglyoxylamide;
2-cyano-2-(O,O-diiodophenylphosphonooximino)-glyoxylamide;
2-cyano-2-(O-amyl-O-methylphosphonooximino)-N,N-dimethylglyoxylamide;
2-cyano-2-(amyl-O-methylphosphinyloximino)-N-phenylglyoxylamide;
2-cyano-2-(allyl-O-chlorobutylphosphinyloximino)-N,N-dicycloproplyglyoxylamide;
2-cyano-2-(chlorophenyl-O-methylphosphinyloximino)-glyoxylamide;
2-cyano-2-(naphthyl-O-butylphosphinyloximino)N,N-dimethylglyoxylamide;
2-cyano-2-(cyclobutyl-O-ethylphosphinyloximino)-glyoxylamide; and
2-cyano-2-(chloromethyl-O-methylphosphinyloximino)-N,N-dimethylglyoxylamide.

The compounds of this invention are readily prepared by reacting an alkali metal (Na, K, Li) salt of 2-cyanoglyoxylamide-2-oxime or an N-substituted (R as aforedefined) derivative thereof with a phosphorochloridate or a phosphonochloridate ester with the desired R and R' substituents as aforedefined.

The 2-cyanoglyoxylamide-2-oxime is prepared from 2-cyanoacetamide or an N-substituted derivative. The cyanoacetamide can be prepared by methods well known in the art. For example, an alkali metal cyanide is reacted with a chloroacetamide. In another procedure, alkali metal cyanide is reacted with ethyl chloroacetate and the resulting ethyl cyanoacetate is reacted with ammonia or an amine to form an amide.

The preparation of the oxime has been described by Ross and Smith, J. Am. Chem. Soc., 86–2861 to 2868 (1964). Note that these authors name 2-cyanoglyoxylamide-2-oxime as isonitrosocyanoacetamide. They describe the following typical procedure.

A suspension of cyanoacetamide (16.8 g.) and potassium nitrite (20.4 g.) in 70 ml. of water was stirred, cooled to 4°, and treated all at one time with glacial acetic acid (24 ml.). After 0.5 hour, the yellow solution was removed from the ice bath and allowed to warm to room temperature. A mild exothermic reaction occurred, raising the reaction mixture to 42°, and shortly thereafter pale yellow needles of the potassium acid salt began to separate. After 1 hour, the product was cooled to 0° and the mass of needles (17.0 g., 68%) collected and washed well with chilled ethanol and ether. The product which gave a red color with alkaline ferrous sulfate was recrystallized once from hot water.

*Analysis.*—Calcd. for $C_6H_5KN_6O_4$ (percent): C, 27.3; H, 1.91; K, 14.8; N, 31.8. Found (percent): C, 27.0; H, 1.89; K, 14.8; N, 31.5.

The potassium salt of isonitrosocyanoacetamide was obtained by treating a hot aqueous solution of the potassium acid salt with the calculated amount of potassium hydroxide. The pure product was extremely soluble in water and required recrystallization from 1:4 water-ethanol. It separated as deep golden yellow needles, M.P. 269° dec.

*Analysis.*—Calcd. for $C_3H_2KN_3O_2$ (percent): K, 25.9. Found (percent): K, 25.7.

Acidification of aqueous solutions of either of the above salts followed by extraction with ether yielded, upon evaporation, the free isonitroso compound which separated from ethyl acetate as colorless, irregular plates, M.P. 181–182° dec. (reported M.P. 184°).

*Analysis.*—Calcd. for $C_3H_3N_3O_2$ (percent): C, 31.9; H, 2.67. Found (percent): C, 31.7; H, 2.55.

Example 1

The sodium salt of 2-cyanoglyoxylamide-2-oxime was prepared by reacting it with sodium methoxide in methanol. The dry sodium salt (10.0 g., 74.0 mmoles) was slurried in 250 ml. benzene. Diethylphosphorochloridate (11.6 g., 67.0 mmoles) was added and the reaction mixture was stirred at reflux for 2 days. The consumption of diethylphosphorochloridate was confirmed by vapor phase chromatography. The cooled reaction mixture was filtered, washed twice with water, and dried over sodium sulfate. Evaporation of the solvent yielded 2-cyano-2-(O,O-diethylphosphonooximino)-glyoxylamide, a yellow oil (5.2 g.). The structure was supported by its IR spectrum, exhibiting cyano absorption at 2250 cm.$^{-1}$, and its NMR spectrum, exhibiting multiplets centered at $\delta 1.40$ (6H) and $\delta 4.36$ (4H).

INSECTICIDE TESTING METHODS

Dip tests

Mexican bean beetle (*Epilachna varivestis* Mulsant).—Lima bean leaves of uniform size are momentarily dipped in a 500 p.p.m. water-acetone solution of the test compound. When dry, the treated leaf is placed in a screened petri dish and exposed to ten fourth instar larvae. The percent mortality is recorded after 48 hours. Compounds that show 90 percent or more mortality are retested at 100 and 10 p.p.m.

Southern armyworm (*Prodenia eridania* Cramer).—This test is carried out as described for the Mexican bean beetle, using ten fourth instar larvae and observing mortality after 48 hours.

Two-spotted spider mite (*Tetranychus telarius* Linnaeus).—Infested trifoliate bean leaves (Henderson Bush lima) are selected that have as many as twenty adult mites per leaf. Leaves with mites attached are momentarily dipped into a 500 p.p.m. emulsion, solution, or suspension of the test compound and then placed (petiole only) in a 4 oz. bottle of water for observation. Percent mortality is observed after 72 hours. If 90–100 percent mortality is observed, compounds are retested at 100 and 10 p.p.m.

Spray tests

Housefly (*Musca domestica* Linnaeus).—Adult houseflies are contained in 100 mm. petri dish screened cages and exposed to a spray of 10 ml. acetone solution of the test compound. An initial concentration of 500 p.p.m. is used, with ten flies in each cage. Percent mortality is observed after 24 hours. When over 90 percent mortality is observed, the compound is retested at the lower concentrations.

Boll weevil (*Anthonomus grandis*).—This test is conducted in a manner similar to that used for the housefly. The test specimens are ten boll weevils per screened petri dish.

Bean aphid (*Aphis fabae*).—This test is conducted in a manner similar to that used for the housefly. The test specimens are nasturtium leaves infested with bean aphids.

German cockroach (*Blattella germanica* Linnaeus).—This test is conducted in a manner similar to that used for the housefly. The test specimens are ten adult roaches per screened petri dish.

Example 2

The compound of Example 1 was subjected to the aforedescribed insecticide tests. Results are set forth in the table and show percent control at the indicated dosage.

TABLE

| Rate, p.p.m. | Housefly | Bean aphid | German cockroach | Boll weevil | Spider mite | Southern armyworm | Mexican bean beetle |
|---|---|---|---|---|---|---|---|
| 500 | 80 | 100 | 100 | 100 | 100 | 100 | 100 |
| 100 | 20 | 100 | 0 | 40 | 70 | 80 | 40 |
| 10 | 20 | 30 | 0 | 20 | 20 | 80 | 30 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A compound having the formula:

$$\begin{array}{c} CN \\ \diagdown \\ C=N-O-P(=O)(OR)(OR') \\ \diagup \\ R_2NC(=O) \end{array}$$

wherein R is the same or different hydrogen, alkyl ($C_1$–$C_5$), alkenyl ($C_2$–$C_6$), cycloalkyl ($C_3$–$C_6$), phenyl, lower haloalkyl, or halophenyl; and R' is alkyl ($C_1$–$C_5$), alkenyl ($C_2$–$C_6$), cycloalkyl ($C_3$–$C_6$), phenyl, naphthyl, alkoxy ($C_1$–$C_5$), alkenoxy ($C_2$–$C_6$), cycloalkoxy ($C_3$–$C_6$), or phenoxy.

2. 2-cyano-2-(O,O-diethylphosphonooximino)-glyoxylamide.

References Cited

FOREIGN PATENTS 1,072,979   6/1967   Great Britain _____ 260—940

JOSEPH REBOLD, Primary Examiner

A. H. SUTTO, Assistant Examiner

U.S. Cl. X.R.

260—972; 424—210